(12) United States Patent
Suzuki et al.

(10) Patent No.: US 12,356,878 B2
(45) Date of Patent: Jul. 15, 2025

(54) COMBINE HARVESTER AND TRAVEL ROUTE CORRECTION METHOD

(71) Applicant: Yanmar Holdings Co., Ltd., Osaka (JP)

(72) Inventors: Hidetaka Suzuki, Osaka (JP); Yuji Yamaguchi, Osaka (JP); Yasuto Nishii, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/039,960

(22) PCT Filed: Oct. 27, 2021

(86) PCT No.: PCT/JP2021/039602
§ 371 (c)(1),
(2) Date: Jun. 1, 2023

(87) PCT Pub. No.: WO2022/118572
PCT Pub. Date: Jun. 9, 2022

(65) Prior Publication Data
US 2024/0032452 A1      Feb. 1, 2024

(51) Int. Cl.
*A01B 69/04*      (2006.01)
*A01D 41/127*    (2006.01)

(52) U.S. Cl.
CPC ........ *A01B 69/008* (2013.01); *A01D 41/1278* (2013.01)

(58) Field of Classification Search
None
See application file for complete search history.

(56) References Cited

U.S. PATENT DOCUMENTS

| | | | | |
|---|---|---|---|---|
| 2003/0187577 A1* | 10/2003 | McClure | ............. | G05D 1/0278 701/50 |
| 2008/0103690 A1* | 5/2008 | Dix | ...................... | G05D 1/0278 701/50 |

(Continued)

FOREIGN PATENT DOCUMENTS

| | | |
|---|---|---|
| JP | 2017-211734 A | 11/2017 |
| JP | 6415880 B2 | 10/2018 |
| JP | 2020-106973 A | 7/2020 |

OTHER PUBLICATIONS

International Search Report dated Jan. 18, 2022 issued in corresponding PCT Application PCT/JP2021/039602.

*Primary Examiner* — Peter D Nolan
*Assistant Examiner* — Jacob Kent Besteman-Street
(74) *Attorney, Agent, or Firm* — NORTON ROSE FULBRIGHT US LLP

(57) ABSTRACT

A combine harvester includes a control device configured to function as a travel route creation unit, an automatic drive control unit, a course movement unit, and a course correction unit. The travel route creation unit creates, in a yet-to-be-reaped area of a field, a travel route that includes parallel first and second straight-line courses. The automatic drive control unit performs control on automatic driving and automatic reaping based on the travel route. While automatic reaping travel is conducted on the first straight-line course, the course movement unit modifies the travel route by moving the first straight-line course in a direction intersecting with the traveling direction. When movement of the first straight-line course results in movement of the first straight-line course in one direction, the course correction unit corrects a portion of the second straight-line course toward the same one direction.

12 Claims, 6 Drawing Sheets

(56) References Cited

U.S. PATENT DOCUMENTS

| | | | |
|---|---|---|---|
| 2011/0231057 A1* | 9/2011 | Ashjaee | B62D 1/28 |
| | | | 701/41 |
| 2013/0158772 A1 | 6/2013 | Swenson et al. | |
| 2020/0326727 A1 | 10/2020 | Palla et al. | |
| 2024/0040947 A1* | 2/2024 | Nishii | A01D 41/1278 |

* cited by examiner

COMBINE HARVESTER AND TRAVEL ROUTE CORRECTION METHOD

CROSS-REFERENCE TO RELATED APPLICATIONS

This application is a national stage application pursuant to 35 U.S.C. § 371 of International Application No. PCT/JP2021/039602, filed on Oct. 27, 2021, which claims priority under 35 U.S.C. § 119 to Japanese Patent Application No. 2020-200125 filed on Dec. 2, 2020, the disclosures of which are hereby incorporated by reference in their entireties.

TECHNICAL FIELD

The present invention relates to a combine harvester that, in a case when a movement of a straight-line course in which an automatic reaping travel is conducted is to be made midway in the straight-line course, corrects another adjacent straight-line course, and a travel route correction method for correcting a travel route of the combine harvester.

BACKGROUND ART

Conventionally, the combine harvester, which reaps cereal culms while traveling in a farm field, can conduct an automatic reaping travel according to a preset travel route based on a position information of the device of the combine harvester that is acquired using a satellite positioning system such as a GPS.

The travel route is created by combining a plurality of straight-line courses in which an automatic reaping travel is to be conducted. Even if the combine harvester conducts the automatic reaping travel according to the straight-line courses of the preset travel route, rows of yet-to-be-reaped cereal culms may deviate from the straight-line course. Therefore, in the combine harvester, an operator may manually adjust direction during the automatic reaping travel of the straight-line course. For example, the combine harvester translates the on-going straight-line course midway in the automatic reaping travel (so-called, pass offset) and continues the automatic reaping travel on the straight-line course after the translation.

For example, in the travel work machine disclosed in the Patent Literature 1, a travel machine body conducts a travel by repeating a straight-line-shaped travel route in which the travel machine body conducts an automatic steering travel straightly while working, and a change-in-direction route in which the travel machine body conducts a manual steering travel to change the direction from the travel end portion of the straight-line-shaped travel route without working. A target travel route adjusting unit of the travel work machine sets a target travel route that has been translated from the original target travel route based on the input by the manual operation as a target travel route on which the travel machine body will travel without translation of the route of the travel machine body midway in the automatic steering travel. Further, the target travel route adjusting unit automatically adjusts the target travel route from the target travel route section that has been adjusted based on the input by the manual operation based on the adjustment amount of the target travel route section.

CITATION LIST

Patent Literature

Patent Literature 1: JP6415880

DISCLOSURE OF INVENTION

Problems to be Solved by the Invention

In the conventional combine harvester, there is a combine harvester that translates the straight-line course midway in the automatic reaping travel and continues the automatic reaping travel of the straight-line course after the translation. However, this combine harvester does not specifically modify another straight-line course following the straight-line course and the modification process such as a translation is needed each time when the work of the straight-line course is conducted. Therefore, a worker needs to decide and operate the correction process each time when the work of the straight-line course is conducted, and this causes a problem that it takes a lot of effort of the worker.

In the Patent Literature 1, there is described an adjustment of the target travel route from the target travel route section that has been adjusted based on the input by the manual operation. However, there is not described for what and how the target travel route is adjusted. For example, there is a problem that, even if the automatic reaping travel of the following straight-line course is continued when the straight-line course of the combine harvester is translated midway in the automatic reaping travel, cereal culms that are not reaped remain. However, the technique described in a prior art and Patent Literature 1 cannot solve the above-described problem.

The object of the present invention is to provide a combine harvester and a travel route correction method that, in a case when a movement of a straight-line course in which an automatic reaping travel is to be conducted is to be made midway in the straight-line course, can appropriately correct another adjacent straight-line course.

Means for Solving the Problems

In order to solve the above-described problem, a combine harvester according to the present invention is a combine harvester that conducts an automatic reaping travel according to a travel route, characterized in that the combine harvester including: a travel route creation unit that creates the travel route including at least a first straight-line course and a second straight-line course parallel to and adjacent to the first straight-line course in a yet-to-be-reaped region in a farm field; an automatic drive control unit that controls automatic traveling and automatic reaping according to the travel route; a course movement unit that moves the first straight-line course in a direction intersecting with a forward direction to correct the travel route while conducting the automatic reaping travel of the first straight-line course; and a course correction unit that, when the first straight-line course is moved to one direction, inclines at least a part of the second straight-line course to the one direction to correct the second straight-line course.

In the combine harvester of the present invention described above, it is preferable that, when an end point of the first straight-line course is moved to one direction by a movement of the first straight-line course, the course correction unit inclines the second straight-line course to the one direction to correct the part of the second straight-line course.

In the combine harvester of the present invention described above, it is preferable that: the combine harvester further includes a correction selecting unit that selects whether the second straight-line course is to be corrected or not when the translation of the first straight-line course is conducted; and the course correction unit modifies the second straight-line course when performance of correction is selected by the correction selecting unit.

In the combine harvester of the present invention described above, it is preferable that, when a straight line connecting a start point and an end point of the first straight-line course is inclined by an angle equal to or larger than a predetermined angle between before and after movement of the first straight-line course, the correction selecting unit enables selection of correction of the second straight-line course.

In the combine harvester of the present invention described above, it is preferable that: the combine harvester further includes a display unit that displays the travel route along with a shape of the farm field; the correction selecting unit displays the second straight-line course before correction and the second straight-line course after correction in different displaying manners on the display unit to enable selection of any one of the second straight-line course before correction and the second straight-line course after correction.

In the combine harvester of the present invention described above, it is preferable that the correction selecting unit displays a reaping width of the second straight-line course that is temporarily selected from the second straight-line course before correction and the second straight-line course after correction on the display unit.

Further, in order to solve the above-described problem, a travel route correction method according to the present invention is a travel route correction method that corrects a travel route in which a combine harvester conducts an automatic reaping travel, characterized in that: the travel route correction method including: a moving step of moving, in the travel route including at least a first straight-line course and a second straight-line course parallel to and adjacent to the first straight-line course in a yet-to-be-reaped region in a farm field, the first straight-line course in a direction intersecting with a forward direction to correct the travel route while conducting the automatic reaping travel of the first straight-line course; and a correcting step of inclining, when the first straight-line course is moved to one direction, at least a part of the second straight-line course in one direction to correct the part of the second straight-line course.

In the travel route correction method of the present invention described above, it is preferable that, when an end point of the first straight-line course is moved to one direction by movement of the first straight-line course, the correcting step inclines the second straight-line course to the one direction to correct the second straight-line course.

In the travel route correction method of the present invention described above, it is preferable that: the moving step conducts translation of the first straight-line course to corrects the travel route; the travel route correction method further includes a selecting step of selecting whether the second straight-line course is to be corrected or not when the translation of the first straight-line course is conducted; the correcting step conducts correction of the second straight-line course when the correction is selected by the selecting step.

In the travel route correction method of the present invention described above, it is preferable that, when a straight line connecting a start point and an end point of the first straight-line course is inclined by an angle equal to or larger than a predetermined angle between before and after movement of the first straight-line course, the selecting step enables selection of correction of the second straight-line course.

In the travel route correction method of the present invention described above, it is preferable that: the selecting step displays the second straight-line course before correction and the second straight-line course after correction in different displaying manners on a display unit of the combine harvester that displays the travel route along with a shape of the farm field to enable selection of any one of the second straight-line course before correction and the second straight-line course after correction.

In the travel route correction method of the present invention described above, it is preferable that the selecting step displays a reaping width of the second straight-line course that is temporarily selected from the second straight-line course before correction and the second straight-line course after correction on the display unit.

Effect of the Invention

According to the present invention, there are provided a combine harvester and a travel route correction method that, in a case when a movement of a straight-line course in which an automatic reaping travel is to be conducted is to be made midway in the straight-line course, can appropriately correct another adjacent straight-line course.

DESCRIPTION OF EMBODIMENTS

Figure 1:
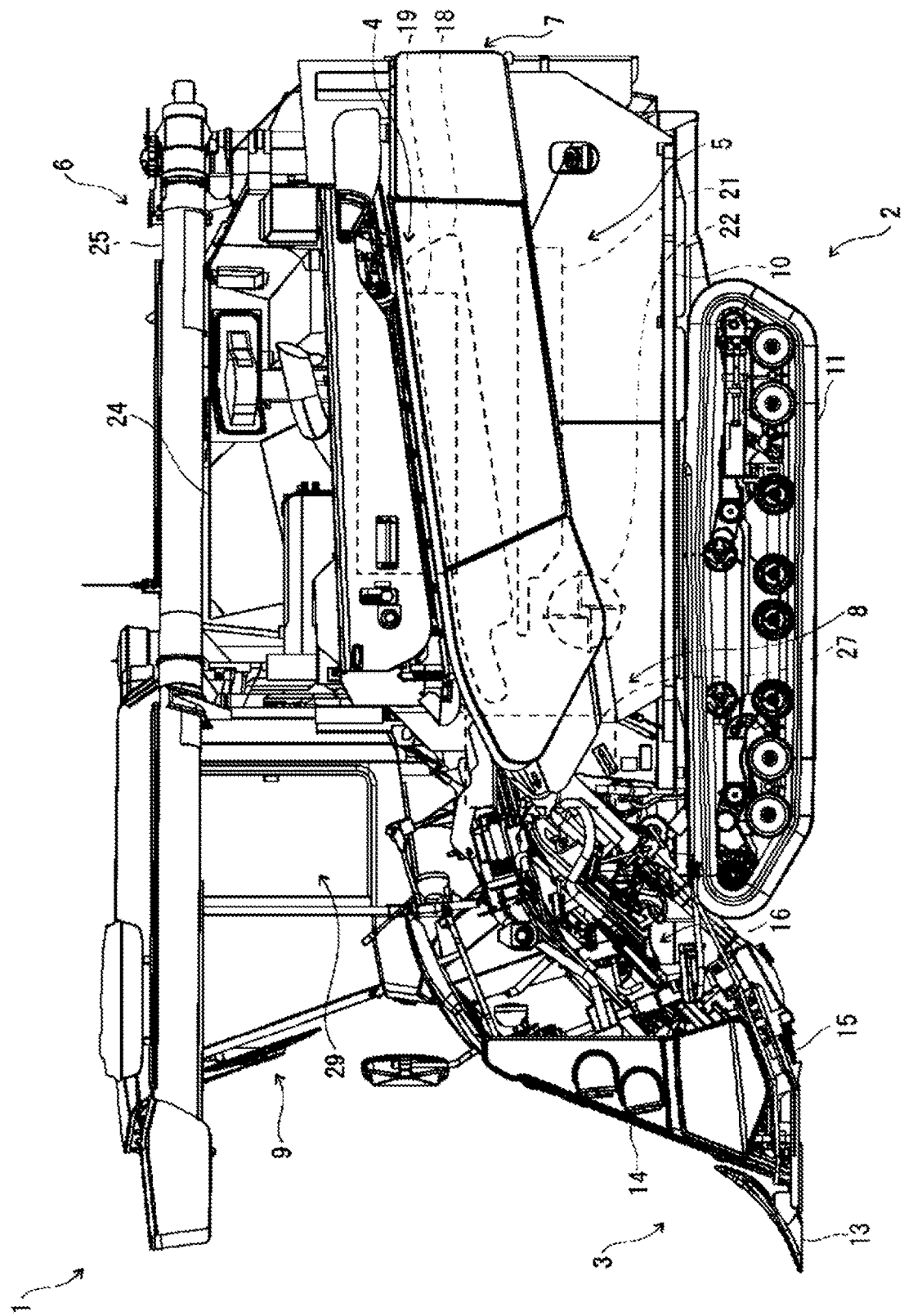
FIG. 1 is a side view of a combine harvester according to an embodiment of the present invention.

A combine harvester 1 according to an embodiment of the present invention will be described. The combine harvester 1 travels in a farm field of a work target by an automatic drive or a manual operation and conducts a work such as reaping for conducting harvesting work of agricultural products from cereal culms planted on a plurality of rows in the farm field. The combine harvester 1 travels on a straight-line-shaped course (hereinafter, straight-line course) having a predetermined number of rows and simultaneously conducts reaping work on the rows.

The combine harvester 1 is configured to previously set a travel route in which a plurality of routes are combined in a predetermined travel pattern and to conduct an automatic reaping travel according to the travel route. For example, the combine harvester 1 conducts an automatic reaping travel of a travel pattern such as a go-and-return reaping in which the combine harvester 1 goes and returns a plurality of courses in a region having yet-to-be-reaped cereal culms in the farm field (hereinafter, referred to as yet-to-be-reaped region), and a circling reaping in which the combine harvester repeats a circle of course along an inside of an outer periphery of the yet-to-be-reaped region while shifting the circle to the center side.

Note that the combine harvester 1 sets the travel route based on a predetermined base information. For example, the combine harvester 1 creates a headland that circles along an outer shape of the farm field by conducting a reaping travel by a manual operation along the inside of the outer periphery of the yet-to-be-reaped region in the farm field. Then, the combine harvester 1 sets a travel route from a base information of a shape of an inner periphery of the headland, that is, based on the headland. In another case, the combine harvester 1 conducts, between two points, a reaping travel by a manual operation in a yet-to-be-reaped region or a travel by a manual operation in a region after the reaping work of the cereal culms (hereinafter, referred to as already-reaped region) in the farm field to set a start point and an end point. Then, the combine harvester 1 sets a travel route from a base information of a straight line (base line) connecting the start point and the end point, that is, based on the straight line between two points.

The combine harvester 1 turns in the headland of the already-reaped region, etc. after the automatic reaping travel of one course is finished, and moves to another course. The combine harvester 1 conducts the automatic reaping travel in any one of an automatic straight travel mode in which the combine harvester travels the course automatically according to the travel route and, on the other hand, travels the turn according to a manual operation, and a fully-automatic travel mode in which the combine harvester 1 travels both of the course and the turn automatically according to the travel route. Note that, in this embodiment, any one of the modes may be set. Further, any of a variety of turning methods may be set for the turn between the courses of the go-and-return reaping, including a U-shaped turn that is a basic turning method in which a 180-degree-turn is conducted only by moving forward, and a fishtail turn in which the combine harvester returns after a 90-degree-turn is conducted by moving forward, and then, another 90-degree-turn is conducted by moving forward. The turning method may be set according to a process between courses, or may be set according to an operation of the worker.

As shown in FIG. 1, the combine harvester 1 includes a traveling unit 2, a reaping unit 3, a threshing unit 4, a sorting unit 5, a storing unit 6, a waste straw processing unit 7, a motive power unit 8, and an operation unit 9, and is configured by a so-called head-feeding type combine harvester. The combine harvester 1 travels by the traveling unit 2, and at the same time, threshes cereal culms reaped by the reaping unit 3 in the threshing unit 4, sorts grains in the sorting unit 5, and stores the sorted grains in the storing unit 6. The combine harvester 1 processes a waste straw after threshing by the waste straw processing unit 7. The combine harvester 1 actuates the traveling unit 2, the reaping unit 3, the threshing unit 4, the sorting unit 5, the storing unit 6, and the waste straw processing unit 7 by the motive power supplied by the motive power unit 8.

The traveling unit 2 is provided below a machine body frame 10 and includes a pair of left and right crawler type traveling device 11 and a transmission (not shown). The traveling unit 2 rotates a crawler of the crawler type traveling device 11 by the motive power (for example, rotation motive power) transmitted from the engine 27 of the motive power unit 8 to make the combine harvester 1 to travel in a front-back direction or turn in a left-right direction. The transmission transmits the motive power (rotation motive power) of the motive power unit 8 to the crawler type traveling device 11 and can also change the speed of the rotation motive power.

The reaping unit 3 is provided in front of the traveling unit 2 and conducts a reaping work of the rows that are equal to or smaller than a maximum number of rows to be reaped included within a predetermined reaping width. The reaping unit 3 includes a divider 13, a raising device 14, a cutting device 15, and a conveying device 16. The divider 13 divides glasses of the cereal culms of the farm field every one row and guides the cereal culms of the predetermined number of rows equal to or smaller than the maximum number of rows to be reaped to the raising device 14. The raising device 14 raises the cereal culms that are guided by the divider 13. The cutting device 15 cuts the cereal culms that are raised by the raising device 14. The conveying device 16 conveys the cereal culms that are cut by the cutting device 15 to the threshing unit 4. Further, the reaping unit 3 includes a stump alignment sensor 17 that detects a distance from the divider 13 to the cereal culm on the left of the reaping unit 3 (see FIG. 3).

The threshing unit 4 is provided behind the reaping unit 3. The threshing unit 4 includes feed chains 18 and a threshing drum 19. The feed chains 18 convey the cereal culms that are conveyed from the conveying device 16 of the reaping unit 3 for threshing and further conveys the cereal culms after threshing, that is, waste straw, to the waste straw processing unit 7. The threshing drum 19 threshes the cereal culms that are being conveyed by the feed chains 18.

The sorting unit 5 is provided below the threshing unit 4. The sorting unit 5 includes a shakingly sorting device 21, a wind sorting device 22, a grain conveying device (not shown), and a straw dust discharging device (not shown). The shakingly sorting device 21 shakes the threshed material dropped from the threshing unit 4 to sort the threshed material into grain and straw dust, etc. The wind sorting device 22 further sorts the threshed material sorted by the shakingly sorting device 21 into grain and straw dust, etc. by blowing air. The grain conveying device conveys the grain sorted by the shakingly sorting device 21 and the wind sorting device 22 to the storing unit 6. The straw dust discharging device discharges the straw dust, etc. sorted by the shakingly sorting device 21 and the wind sorting device 22 to an outside of the machine.

The storing unit 6 is provided on the right side of the threshing unit 4. The storing unit 6 includes a grain tank 24 and a discharging device 25. The grain tank 24 stores the grain conveyed by the sorting unit 5. The discharging device 25 is composed of an auger, etc. and discharges the grain stored in the grain tank 24 to a selected place.

The waste straw processing unit 7 is provided behind the threshing unit 4. The waste straw processing unit 7 includes a waste straw conveying device (not shown) and a waste straw cutting device (not shown). The waste straw conveying device conveys the waste straw conveyed from the feed chains 18 of the threshing unit 4 to the waste straw cutting device. The waste straw cutting device cuts the waste straw conveyed by the waste straw conveying device and discharges the waste straw to an outside of the machine, for example, discharges to the right rear side of the combine harvester 1.

The motive power unit 8 is provided above the traveling unit 2 and in front of the storing unit 6. The motive power unit 8 includes the engine 27 for generating a rotation motive power. The motive power unit 8 transmits the rotation motive power generated by the engine 27 to the traveling unit 2, the reaping unit 3, the threshing unit 4, the sorting unit 5, the storing unit 6, and the waste straw processing unit 7.

The operation unit 9 is provided above the motive power unit 8. The operation unit 9 includes a driver's seat 29 and a plurality of operation tools 30 (see FIG. 3). The driver's seat 29 is a seat on which the worker sits and is provided, for example, on the right side. The operation tools 30 include a handle for changing the forward direction of the combine harvester 1, that is, for manipulating the steering of the combine harvester 1, and the worker operates the operation tools 30 such as the handle to operate the travel and the work of the combine harvester 1. Further, the operation tools 30 include an accelerator that adjusts a rotation speed of the engine 27, that is, the travel speed of the traveling unit 2 of the combine harvester 1, and an elevation switch that elevates the reaping unit 3.

Figure 3:
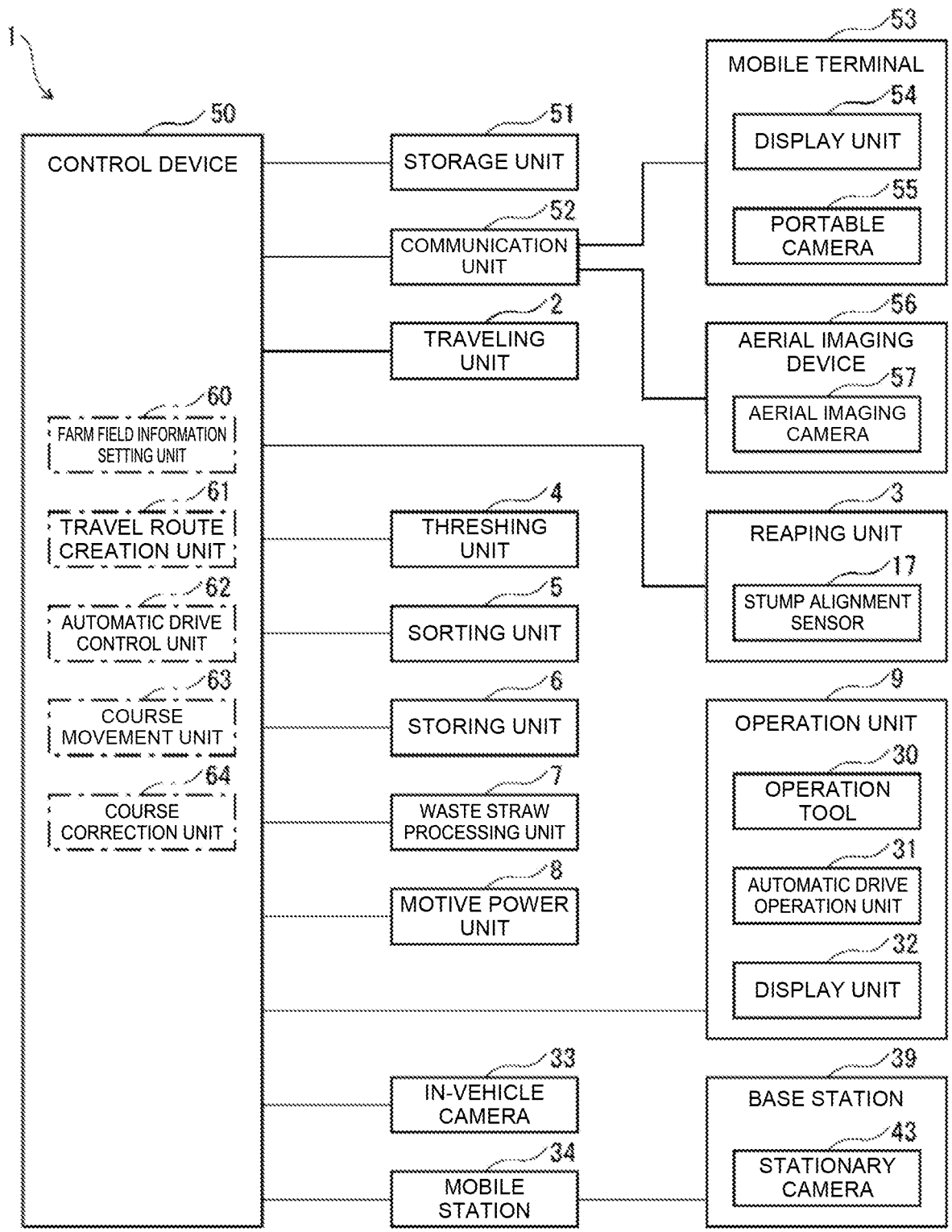
FIG. 3 is a block diagram of the combine harvester according to the embodiment of the present invention.

Further, the operation unit 9 includes an automatic drive operation unit 31 that operates setting and conducting, etc. of the automatic reaping travel and a display unit 32 such as a tach panel (see FIG. 3). The automatic drive operation unit 31 may display a farm field map based on a farm field information about the farm field of the work target on the display unit 32 and, at the same time, display the travel route of the combine harvester 1 on the farm field map on the display unit 32 so that the forward direction can be seen. The automatic drive operation unit 31 preferably displays the yet-to-be-reaped region on the farm field map and updates the farm field map so that the already-reaped region is painted over as the automatic reaping travel progresses.

The automatic drive operation unit 31 may be, for example, configured to accept a selection of any mode of the automatic straight travel mode and the fully-automatic travel mode, and further, includes a start switch for starting the automatic reaping travel on the course after a turn by manual operation in the automatic straight travel mode. The automatic drive operation unit 31 includes a movement switch for translating the on-going straight-line course midway in the automatic reaping travel (so-called, pass offset) and is configured to accept a setting of a moving width and a moving direction of the translation. The automatic drive operation unit 31 includes a pause switch and a restart switch of the automatic reaping travel for accepting a manual operation that moves the on-going straight-line course in a direction intersecting with the forward direction midway in the automatic reaping travel.

The automatic drive operation unit 31 has a function of accepting a selection of the travel pattern of the automatic reaping travel of the combine harvester 1 (go-and-return reaping or circling reaping) when creating a travel route of the automatic reaping travel. For example, the automatic drive operation unit 31 enables selection of the travel pattern of the go-and-return reaping or the circling reaping via the travel setting screen displayed on the touch panel, and sends a selected travel pattern to the control unit 50.

Further, the automatic drive operation unit 31 has a function of accepting a selection of base information (based on the headland or based on the straight line between two points) for creating a travel route when a travel route of the automatic reaping travel is created. The automatic drive operation unit 31, for example, enables selection of the base information of based on the headland or based on the straight line between two points via the travel setting screen displayed on the touch panel, and sends a selected base information to the control unit 50.

The combine harvester 1 includes an in-vehicle camera 33 that takes an image of the periphery of the combine harvester 1 (see FIG. 3). The in-vehicle camera 33 takes an image of the farm field of the work target to acquire a farm field image.

Figure 2:
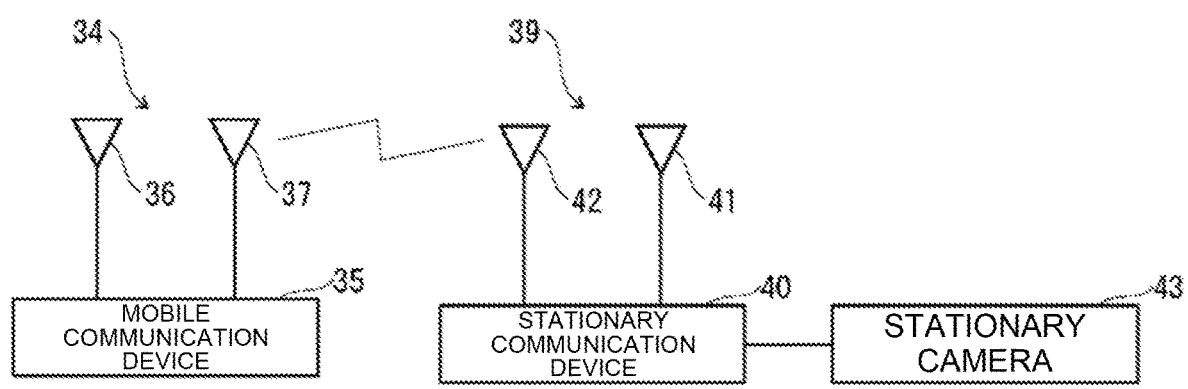
FIG. 2 is a block diagram of a mobile station and a base station of the combine harvester according to the embodiment of the present invention.

As shown in FIG. 2, the combine harvester 1 includes the mobile station 34 that acquires the position information of the combine harvester 1 using a satellite positioning system such as a GPS. For example, the mobile station 34 includes a mobile communication device 35, a mobile GPS antenna 36, and a data receiving antenna 37. The mobile communication device 35 communicates with a GPS satellite by the mobile GPS antenna 36 to acquire the position information of the mobile station 34, that is, the position information of the combine harvester 1.

Note that, as shown in FIG. 2, a base station 39 may be provided on a ridge, etc. surrounding the farm field that is to be the work target of the combine harvester 1. In this embodiment, an example in which the base station 39 is used for correction of the position information of the combine harvester 1 is described. However, the base station 39 may not be included and the correction of the position information by the base station 39 may not be conducted. The base station 39 includes a stationary communication device 40, a stationary GPS antenna 41, and a data sending antenna 42. The stationary communication device 40 communicates with a GPS satellite by the stationary GPS antenna 41 to acquire a position information of the base station 39. The stationary communication device 40 sends a correction information based on the position information of the base station 39 to the mobile communication device 35 via the data sending antenna 42.

Further, the base station 39 includes a stationary camera 43 that takes an image of the farm field. The stationary camera 43 takes the image of the farm field of the work target to acquire the farm field image. The stationary communication device 40 acquires the image taken by the stationary camera 43 and sends it to the mobile communication device 35 via the data sending antenna 42.

The mobile communication device 35 of the mobile station 34 conducts wireless communication with the stationary communication device 40 of the base station 39 via the data receiving antenna 37. The mobile communication device 35 receives the correction information from the stationary communication device 40 and corrects the position information of the mobile station 34, that is, the position information of the combine harvester 1, based on the correction information. The mobile communication device 35 receives the farm field image taken by the stationary camera 43 from the stationary communication device 40.

Next, the control unit 50 of the combine harvester 1 will be described with reference to FIG. 3.

The control unit 50 is composed of a computer such as a CPU, and is connected to the storage unit 51 such as a ROM, a RAM, a hard disk drive, a flash memory, etc. The storage unit 51 stores a program and data for controlling a variety of components and a variety of functions of the combine harvester 1 and controls the variety of components and the variety of functions by running a calculation process by the control unit 50 based on the program and the data stored in the storage unit 51. For example, the control unit 50 controls the mobile station 34 to acquire the position information of the combine harvester 1 from the mobile communication device 35.

The combine harvester 1 includes a communication unit 52 and the control unit 50 conducts wireless communication with an external device such as a mobile terminal 53 held by the worker via the communication unit 52 to send and receive a variety of information to and from the mobile terminal 53.

The mobile terminal 53 is a terminal capable of remotely controlling the combine harvester 1, and is composed of a tablet type terminal or a laptop type personal computer, etc. including a display unit 54 such as a touch panel. Note that the operation tools 30 or the automatic drive operation unit 31 similar to the mobile terminal 53 may be included in the operation unit 9. Note that the mobile terminal 53 may include a portable camera 55 that takes an image. For example, the portable camera 55 takes an image of the farm field of the work target to acquire the farm field image. In this embodiment, an example in which the portable camera 55 is used for acquiring the farm field information is described. However, the portable camera 55 may not be included and the acquisition of the farm field information by the portable camera 55 may not be conducted.

The mobile terminal 53 is configured to accept an input operation by a touch operation, etc. on the touch panel for the farm field information about the farm field of the work target. For example, the mobile terminal 53 displays a farm field information setting screen on which a shape, a size, and position information (such as coordinates), etc. of the edge of the farm field that configures an outer periphery of the farm field, and shapes, sizes, and position information (such as coordinates), etc. of the headland (already-reaped region) and the yet-to-be-reaped region of the farm field can be set as the farm field information. The mobile terminal 53 may display the farm field map based on the farm field information on the display unit 54 similarly to the automatic drive operation unit 31.

Further, the mobile terminal 53 may be configured to have a function similar to the automatic drive operation unit 31 of the operation unit 9. For example, the mobile terminal 53 has a function of accepting a selection of the travel pattern of the travel route and a selection of the base information of the travel route via the touch panel, and sends the result of the selections to the combine harvester 1.

Note that the control unit 50 may conduct wireless communication with an aerial imaging device 56 such as a drone including an aerial imaging camera 57 via the communication unit 52, and the aerial imaging device 56 may conduct wireless communication with the mobile terminal 53. In this embodiment, an example in which the aerial imaging device 56 and the aerial imaging camera 57 are used for acquiring the farm field information is described. However, the aerial imaging device 56 and the aerial imaging camera 57 may not be included and the acquisition of the farm field information by the aerial imaging camera 57 may not be conducted. The control unit 50 or the mobile terminal 53 accepts an operation command of the aerial imaging device 56 and an imaging command of the farm field by the worker and sends these commands to the aerial imaging device 56. The aerial imaging device 56 operates according to the operation command, and controls the aerial imaging camera 57 according to the imaging command to acquire the farm field image by taking an image of the farm field. The aerial imaging device 56 sends the farm field image taken by the aerial imaging camera 57 to the control unit 50 or the mobile terminal 53.

The control unit 50 receives the farm field image taken by the in-vehicle camera 33, the stationary camera 43, the portable camera 55, or the aerial imaging camera 57 and displays it on the display unit 32 of the operation unit 9. In another case, the control unit 50 may send the taken farm field image to the mobile terminal 53 and display it on the display unit 54 of the mobile terminal 53.

Further, the control unit 50 may act as a farm field information setting unit 60, a travel route creation unit 61, an automatic drive control unit 62, a course movement unit 63, and a course correction unit 64 by running the program stored in the storage unit 51. Note that the course movement unit 63 and the course correction unit 64 are to realize a moving step and a correction step of the travel route correction method according to the present invention. Note that, in the travel route correction method, the control unit 50 based on the operation of the automatic drive operation unit 31 realizes a selection step described below.

The farm field information setting unit 60 automatically or manually sets the farm field information about the farm field of the work target and stores the information in the storage unit 51. For example, the farm field information setting unit 60 manually sets the farm field information according to an input operation of the farm field information to the farm field information setting screen of the mobile terminal 53. In another case, the farm field information setting unit 60 acquires the farm field image that is an image of the farm field taken by the in-vehicle camera 33 of the combine harvester 1, the stationary camera 43 of the base station 39, the portable camera 55 of the mobile terminal 53, or the aerial imaging camera 57 of the aerial imaging device 56, and automatically acquires the farm field information by conducting an image analysis on the farm field image. Note that the farm field information setting unit 60 may analyze the farm field image taken by any one camera of the in-vehicle camera 33, the stationary camera 43, the portable camera 55, or the aerial imaging camera 57 for the farm field information, and may analyze the farm field image taken by two or more cameras for the farm field information.

Further, the farm field information setting unit 60 may acquire a more correct farm field information by checking for consistency between the farm field information manually set via the mobile terminal 53 and the farm field information automatically set from the farm field image taken by the in-vehicle camera 33, the stationary camera 43, the portable camera 55, and the aerial imaging camera 57.

The travel route creation unit 61 creates the travel route that is to be referenced so that the combine harvester 1 will conduct the automatic traveling and the automatic reaping by the automatic drive in the farm field, and stores the created travel route in the storage unit 51. The travel route includes not only a travel setting about traveling but also a work setting about a work such as reaping. The travel setting includes, in addition to a travel position in the farm field, a travel speed and a forward direction (steering direction and forwarding or returning) at each travel position. The work setting includes information about actuation or stop of reaping at each travel position, reaping speed and reaping height, a number of rows to be reaped, and other works.

The travel route creation unit 61 sets a straight-line-shaped course that is to be traveled and reaped in the yet-to-be-reaped region in the farm field based on the farm field information set by the farm field information setting unit 60, and sets the travel route by combining a plurality of straight-line course. The travel route creation unit 61 creates a travel route according to a preset travel pattern (go-and-return reaping or circling reaping), or a travel pattern selected according to an operation of the automatic drive operation unit 31 of the operation unit 9 or the mobile terminal 53. For example, the travel route creation unit 61 creates a travel route for a circling reaping in which the combine harvester repeats a circular turn of a straight line course along an inside of an outer periphery of the yet-to-be-reaped region while shifting the circle to the center side, and a course for go-and-return reaping in which the combine harvester goes and returns a plurality of straight-line courses in a yet-to-be-reaped region. In this embodiment, in any of the circling reaping and the go-and-return reaping, two or more straight-line courses are aligned so that the straight-line courses will be parallel to each other at a distance of a predetermined reaping width.

Further, the travel route creation unit 61 creates a travel route according to preset base information (based on the headland or based on the straight line between two points), or base information selected according to an operation of the automatic drive operation unit 31 of the operation unit 9 or the mobile terminal 53. When based on the headland is set, the travel route creation unit 61 can create the travel route in any travel pattern of the go-and-return reaping and the circling reaping. In the circling reaping based on the headland, the travel route creation unit 61 creates a spiral-shaped travel route of straight-line courses along the inside of an outer periphery of the yet-to-be-reaped region that is an inner periphery of the headland. In the go-and-return reaping based on the headland, the travel route creation unit 61 creates a travel route in which the combine harvester goes and returns a plurality of straight-line courses in the yet-to-be-reaped region that is an inside shape of the headland. Further, when the go-and-return reaping based on the straight line between two points is set, the travel route creation unit 61 creates a travel route of the go-and-return reaping in which the combine harvester goes and returns a plurality of straight-line courses corresponding to straight lines parallel to the base line based on the base line of which the start point and the end point are set.

The automatic drive control unit 62 controls the motive power unit 8, as well as the traveling unit 2 and the reaping unit 3 based on the travel setting and the work setting of the travel route created in the travel route creation unit 61 to conduct the automatic traveling and the automatic reaping according to the travel route. The automatic drive control unit 62 automatically reaps the yet-to-be-reaped cereal culms on the travel route by the reaping unit 3. Further, along with the automatic reaping, the automatic drive control unit 62 controls the threshing unit 4, sorting unit 5, the storing unit 6, and the waste straw processing unit 7 to automatically conduct threshing of the cereal culms after the reaping, sorting of grains and straw dusts after the threshing, storing of the grains after the sorting, and processing of the waste straw after the threshing, etc. Note that, the combine harvester 1 includes a gyro sensor and a direction sensor to acquire a displacement information and a direction information of the combine harvester 1, and the automatic drive control unit 62 may adjust the automatic travel of the combine harvester 1 based on the displacement information and the direction information.

Note that, when the automatic straight travel mode is set, the automatic drive control unit 62 stops the automatic reaping travel when the automatic reaping travel of one straight-line course in the travel route is finished. Further, when a travel by a manual operation to a start point of a next straight-line course is finished, the automatic drive control unit 62 starts the automatic reaping travel of the next straight-line course according to an operation of the start switch by the automatic drive operation unit 31 of the operation unit 9 or the mobile terminal 53.

While the automatic reaping travel is conducted by the automatic drive control unit 62, the course movement unit 63 moves the on-going straight-line course (hereinafter, referred to as first straight-line course) in a direction intersecting with the forward direction according to a manual operation of the automatic drive operation unit 31 of the operation unit 9 or the mobile terminal 53 to adjust the route. For example, the course movement unit 63 modifies the travel route so as to translate the first straight-line course in any one of left and right directions intersecting with the forward direction by a predetermined moving width (so-called, pass offset) according to the operation of the movement switch of the automatic drive operation unit 31. The moving width and the moving direction may be set beforehand, and may be set according to an operation of the automatic drive operation unit 31.

When the first straight-line course is modified, the course movement unit 63 controls to move the position of the combine harvester 1 according to the first straight-line course after correction. For example, the course movement unit 63 detects the position of the combine harvester 1 with respect to rows of cereal culms in the yet-to-be-reaped region based on a detection result by the stump alignment sensor 17 and controls the motive power unit 8 and the traveling unit 2 to move the combine harvester 1 so that the detected position of the combine harvester 1 will correspond to the first straight-line course after modification.

Further, when the position of the combine harvester 1 is adjusted by a manual operation while the automatic reaping travel is being conducted, the course movement unit 63 modifies the travel route so as to move the first straight-line course according to the adjusted position of the combine harvester 1 (position correction).

When the first straight-line course on which the automatic reaping travel is being conducted is moved by the course movement unit 63, the course correction unit 64 corrects another straight-line course on the travel route in the yet-to-be-reaped region according to the movement of the first straight-line course. Specifically, the course correction unit 64 corrects another straight-line course adjacent to the first straight-line course (hereinafter, referred to as second straight-line course) when the automatic reaping travel on the first straight-line course after movement is finished and the end point of the first straight-line course is decided. Note that the course correction unit 64 may automatically correct the second straight-line course at a predetermined timing after the automatic reaping travel on the first straight-line course is finished and before the automatic reaping travel on the second straight-line course is started, or may correct the second straight-line course according to a manual operation of the automatic drive operation unit 31 of the operation unit 9 or the mobile terminal 53.

When the end point of the first straight-line course after movement is moved to one side (in one direction) of the left and right directions intersecting with the forward direction with respect to the end point of the first straight-line course before movement, the course correction unit 64 corrects the second straight-line course by inclining the second straight-line course in the same one direction. For example, the course correction unit 64 corrects the second straight-line course so that the second straight-line course will be parallel to the straight line connecting the start point and the end point of the first straight-line course. In other words, the course correction unit 64 may conduct correction by moving the tip points of the second straight-line course similarly to the movement of the end point of the first straight-line course before and after movement. In another case, when the line connecting the start point and the end point of the first straight-line course after movement is inclined by a predetermined incline angle with respect to the first straight-line course before movement, the course correction unit 64 may correct the second straight-line course by inclining the second straight-line course by an angle that is larger than the above-described incline angle.

Note that the course correction unit 64 preferably corrects the second straight-line course by inclining the second straight-line course so that one tip point of the start point and the end point of the second straight-line course on a same side in the forward direction as the start point of the first straight-line course is fixed and the other tip point is moved to one direction. In another case, the course correction unit 64 may set the fixed point of the second straight-line course at a predetermined position between the start point and the end point so that the cereal culms will not remain based on the yet-to-be-reaped region at the time when the automatic reaping travel on the first straight-line course is finished. The course correction unit 64 may similarly correct each of the following straight-line courses in addition to the second straight-line course adjacent to the first straight-line course.

Figure 4:
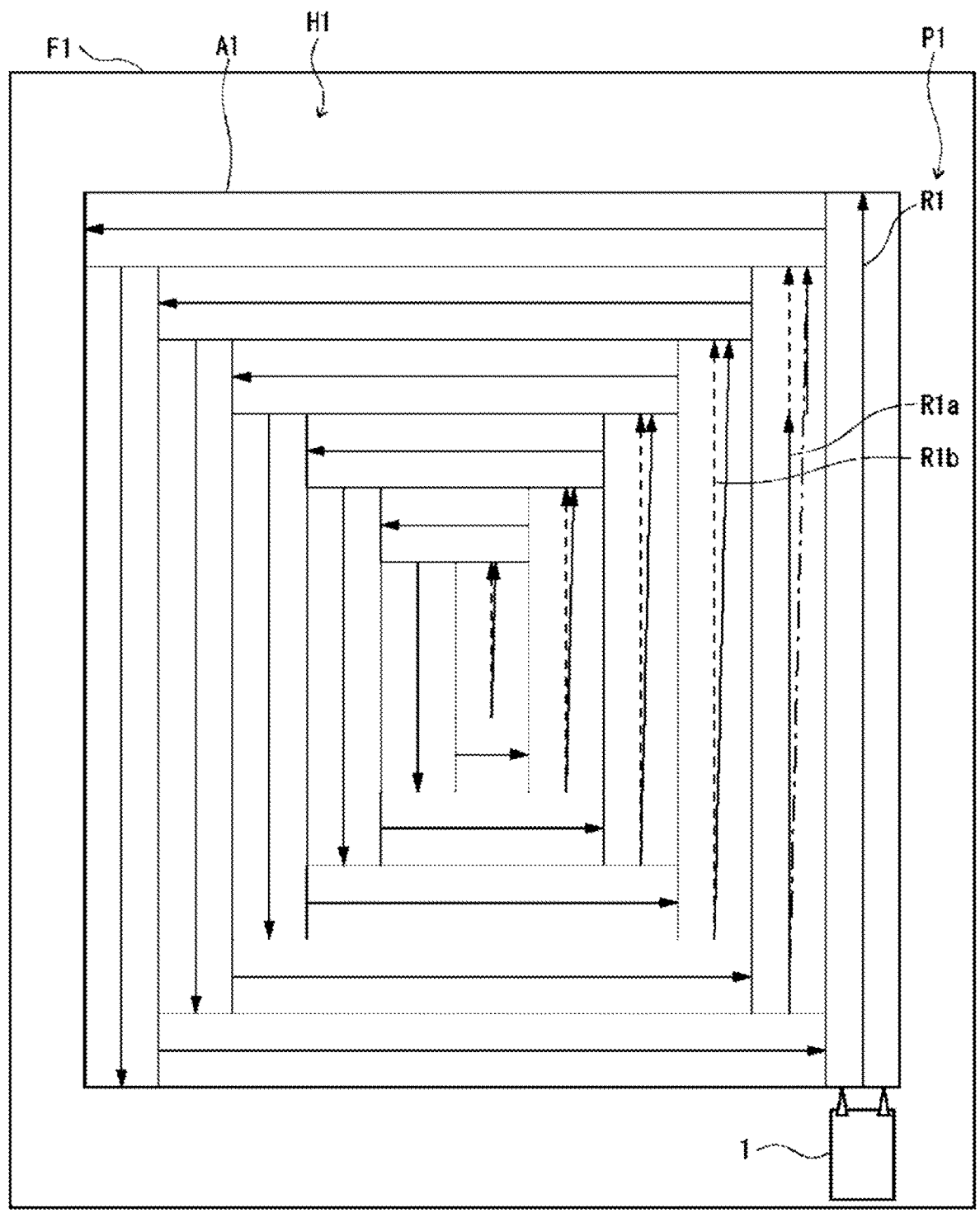
FIG. 4 is a plan view of a first example operation of a movement of an on-going first straight-line course and a correlation of an adjacent second straight-line course in the combine harvester according to the embodiment of the inclusion.

Next, first example operation of conducting movement of an on-going first straight-line course and correlation of an adjacent second straight-line course when the combine harvester 1 conducts the automatic reaping travel on the travel route of the circling reaping based on the headland. FIG. 4 shows an example of setting a travel route P1 of the circling reaping in which a circle of a straight-line courses R1 is repeated along an inner periphery (inside of an outer periphery of a yet-to-be-reaped region A1) of a headland H1 surrounding the yet-to-be-reaped region A1 while the circle of the straight-line courses R1 is shifted to the center side for conducting an automatic reaping travel of the yet-to-be-reaped region A1 in the farm field F1. In the travel route P1 of the circling reaping, the straight-line courses R1 having the same forward direction are aligned parallel to each other at a distance of predetermined reaping width on each edge of the yet-to-be-reaped region A1.

In the automatic reaping travel of a first straight-line course R1$a$ of the preset travel route P1, for example, when a discrepancy between the first straight-line course R1$a$ and a row of the yet-to-be-reaped cereal culms is recognized midway in the work on the first straight-line course R1$a$, a worker operates the movement switch of the automatic drive operation unit 31 of the operation unit 9 to order the movement of the combine harvester 1.

The course movement unit 63 translates a part of the first straight-line course R1$a$ after the order of the movement according to an operation of the movement switch of the automatic drive operation unit 31 to modify the travel route. In this case, the first straight-line course R1$a$ is preferably moved toward the row of the yet-to-be-reaped cereal culms. In FIG. 4, the first straight-line course R1$a$ after the order of the movement is drawn in a dashed line before the movement and is drawn in a solid line after the movement. In this case, since the end point of the first straight-line course R1$a$ is moved, the course movement unit 63 preferably corrects the position of the start point of another straight-line course following the end point of the first straight-line course R1$a$ in the circling reaping according to the position of the end point of the first straight-line course R1$a$. Further, the course movement unit 63 moves the position of the combine harvester 1 according to the first straight-line course R1$a$ after movement.

Then, when the automatic reaping travel of the first straight-line course R1$a$ after movement is finished, the course correction unit 64 corrects the second straight-line course R1$b$ that is adjacent to the inner side of the first straight-line course R1$a$ in the travel route P1 of the circling reaping so that the second straight-line course R1$b$ will be parallel to the line connecting the start point and the end point of the first straight-line course R1$a$. In this case, since the end point of the second straight-line course R1$b$ is moved, the course correction unit 64 preferably corrects the position of the start point of another straight-line course following the end point of the second straight-line course R1$b$ according to the position of the end point of the second straight-line course R1$b$. Note that, the course correction unit 64 preferably corrects each of the straight-line courses R1 that are further adjacent to the inside of the corrected second straight-line course R1$b$ of each of the straight-line course R1 in the yet-to-be-reaped region so that the straight-line courses R1 will be parallel to the first straight-line course R1$a$ similarly to the second straight-line course R1$b$.

Figure 5:
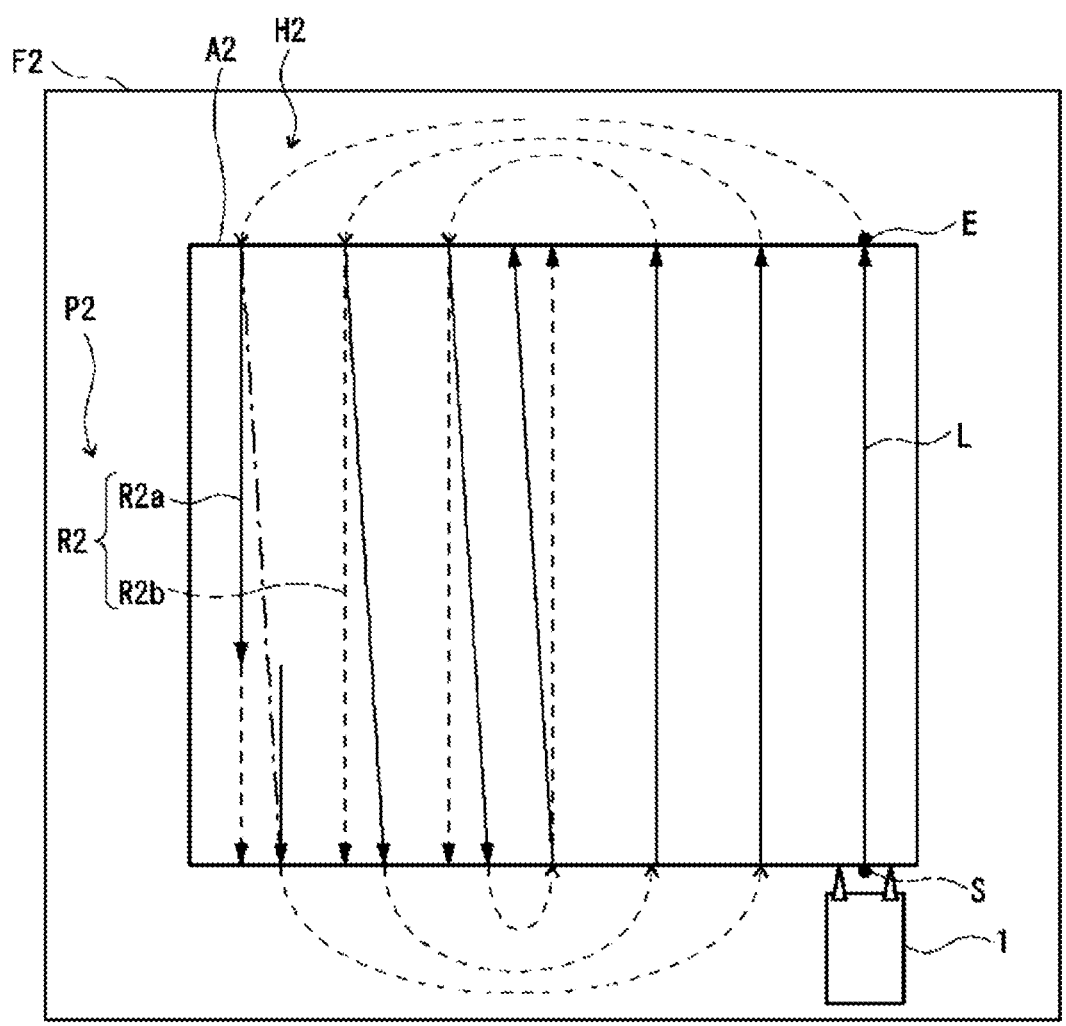
FIG. 5 is a plan view of a second example operation of a movement of an on-going first straight-line course and a correlation of an adjacent second straight-line course in the combine harvester according to the embodiment of the inclusion.

Next, second example operation of conducting movement of an on-going first straight-line course and correlation of an adjacent second straight-line course when the combine harvester 1 conducts the automatic reaping travel on the travel route of the go-and-return reaping based on a straight line between two points. FIG. 5 shows an example in which a travel route P2 of go-and-return reaping in which the combine harvester goes and returns a plurality of straight-line courses R2 corresponding to straight lines parallel to a base line L based on the base line L that connects a start point S and an end point E set in a yet-to-be-reaped region A2 for conducting the automatic reaping travel on the yet-to-be-reaped region A2 in a farm field F2. In the travel route P2 of the go-and-return reaping, the plurality of straight-line courses R2 are aligned parallel to each other at a distance of predetermined reaping width. The travel route P2 is configured to conduct the go-and-return travel in which the combine harvester travels in one direction on the straight-line course R2 on one end side in the row aligning direction that intersects with the row direction, and then, travels on the headland to move to the other side, and travels in another direction (opposite direction to the one direction) on the straight-line course R2 on the other end side. A processing order of the plurality of straight-line course R2 in the travel route P2 is set so that the process will proceed from both end sides in the aligning direction to the center side, and therefore, the start course is set on one end side in the aligning direction and the finish course is set on the center side in the aligning direction.

In the automatic reaping travel of the first straight-line course R2$a$ of the preset travel route P2, for example, when a discrepancy between the first straight-line course R2$a$ and a row of the yet-to-be-reaped cereal culms is recognized during the work on the first straight-line course R2$a$, a worker operates the movement switch of the automatic drive operation unit 31 of the operation unit 9 to order the movement of the combine harvester 1.

The course movement unit 63 translates a part of the first straight-line course R2$a$ after the order of movement according to an operation of the movement switch of the automatic drive operation unit 31 to modify the travel route. In this case, the first straight-line course R2a is preferably moved toward the row of the yet-to-be-reaped cereal culms. In FIG. 5, the first straight-line course R2a after the order of the movement is drawn in a dashed line before the movement and is drawn in a solid line after movement. Further, the course movement unit 63 moves the position of the combine harvester 1 according to the first straight-line course R2a after movement.

Then, when the automatic reaping travel of the first straight-line course R2a after movement is finished, the course correction unit 64 corrects the second straight-line course R2b that is adjacent to the first straight-line course R2a in the travel route P2 of the go-and-return reaping so that the second straight-line course R2b will be parallel to the line connecting the start point and the end point of the first straight-line course R2a. Note that, the course correction unit 64 preferably corrects each of the straight-line courses R2 that are further adjacent to the center side in the aligning direction of the corrected second straight-line course R2b of each of the straight-line courses R2 in the yet-to-be-reaped region so that the straight-line courses R2 will be parallel to the first straight-line course R2a similarly to the second straight-line course R2b. Further, in the travel route P2 of the go-and-return reaping, the forward directions of the last straight-line course R2 and the straight-line course R2 just before the last straight-line course R2 adjacent to each other are different from each other, and when assuming the straight-line course R2 just before the last straight-line course R2 to be a second straight-line course R2b, the course correction unit 64 may correct the second straight-line course R2b so that the second straight-line course R2b will be parallel to the first straight-line course R2a. In this case, the course correction unit 64 preferably corrects the last straight-line course R2 so that the last straight-line course R2 will be parallel to the first straight-line course R2a similarly to the second straight-line course R2b.

In the example correction of the travel route by the course correction unit 64 described above, an example in which the whole second straight-line course adjacent to the moved first straight-line course is corrected so that the whole second straight-line course will be parallel to the whole straight line connecting the start point and the end point of the first straight-line course is described. However, the present invention is not limited to this example. For example, in another example correction, the course correction unit 64 may correct at least a part of the second straight-line course so that the part of the second straight-line course will be parallel to the line connecting the movement start point and the movement end point of the first straight-line course.

Figure 6:
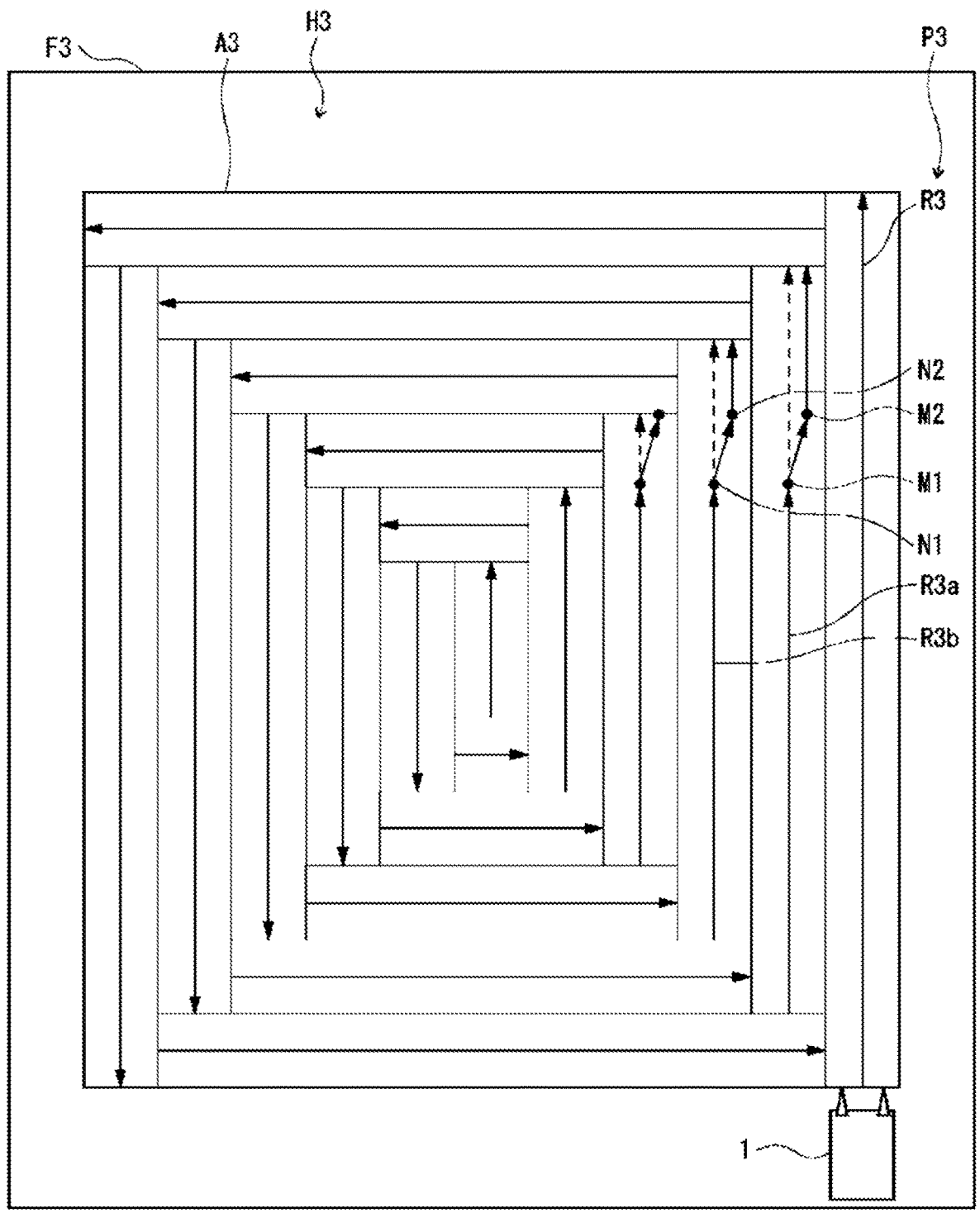
FIG. 6 is a plan view of another example of a movement of an on-going first straight-line course and a correlation of an adjacent second straight-line course by the combine harvester according to the embodiment of the inclusion.

Another example correction will be described with reference to FIG. 6. FIG. 6 shows an example of setting a travel route P3 of the circling reaping in which a circle of straight-line courses R3 is repeated along an inner periphery of a headland H3 surrounding a yet-to-be-reaped region A3 (inside of an outer periphery of the yet-to-be-reaped region A1) while the circle of the straight-line courses R3 is shifted to the center side for conducting an automatic reaping travel of the yet-to-be-reaped region A3 in a farm field F3.

In another example correction, a movement start point M1 and a movement end point M2 when the course movement unit 63 moves the first straight-line course R3a in a row aligning direction that intersects with the row direction are stored in the storage unit 51, etc.

The course correction unit 64 sets coordinates in the row direction of the movement start point M1 and the movement end point M2 of the first straight-line course R3a as coordinates in the row direction of a correction start point N1 and a correction end point N2 of the second straight-line course R3b. Further, the course correction unit 64 sets an incline angle from the movement start point M1 to the movement end point M2 of the first straight-line course R3a between the correction start point N1 and the correction end point N2 of the second straight-line course R3b. In other words, the course correction unit 64 sets displacement of the movement end point M2 in the aligning direction for the correction end point N2. Further, the course correction unit 64 sets coordinates in the aligning direction of the second straight-line course R3b after the correction end point N2 to be equal to the correction end point N2.

According to the above, the course correction unit 64 conducts the correction by inclining only the corrected part of the second straight-line course R3b (that is, a part between the correction start point N1 and the correction end point N2) corresponding to the moved part of the first straight-line course R3a (that is, a part between the movement start point M1 and the movement end point M2) so that the corrected part of the second straight-line course R3b will be parallel to the straight line connecting the movement start point M1 and the movement end point M2 of the first straight-line course R3a.

Note that, as shown in FIG. 6, since the length of the straight-line course R3 in the row direction becomes shorter as the travel route P3 of the circling reaping proceeds to the center side, the second straight-line course may not be corrected in a case when this second straight-line course does not reach the coordinates in the row direction corresponding to the moved part of the first straight-line course.

According to the combine harvester 1 of this embodiment, the course movement unit 63 can move the on-going first straight-line course to correct the travel route and the course correction unit 64 can appropriately correct the second straight-line course according to the movement of the first straight-line course regardless of the kind of the travel pattern and the kind of the base information.

As described above, according to this embodiment, the combine harvester 1 includes the control unit 50 and the control unit 50 functions as the travel route creation unit 61, the automatic drive control unit 62, the course movement unit 63, and the course correction unit 64. The travel route creation unit 61 creates the travel route including at least the first straight-line course and the second straight-line course parallel to the first straight-line course in the yet-to-be-reaped region in the farm field. The automatic drive control unit 62 controls the automatic traveling and the automatic reaping according to the travel route. The course movement unit 63 moves the first straight-line course in a direction intersecting with the forward direction while conducting the automatic reaping travel of the first straight-line course to correct the travel route. When the first straight-line course is moved to one direction by the movement of the first straight-line course, the course correction unit 64 inclines at least a part of the second straight-line course in the same one direction to correct the second straight-line course.

For example, when the end point of the first straight-line course is moved to one direction by the movement of the first straight-line course, the course correction unit 64 preferably inclines the second straight-line course in the same one direction to correct the second straight-line course.

When the first straight-line course is moved during the on-going first straight-line course of the automatic reaping travel, the combine harvester 1 according to this embodiment also corrects the adjacent second straight-line course, and therefore, a correction process is not need to be conducted each time the work of the straight-line course is conducted. Therefore, a worker does not need to decide and operate the correction process of each straight-line course each time the work of the straight-line course is conducted, and the effort of the worker can be reduced.

On the other hand, there may be a problem that, when the on-going first straight-line course in the automatic reaping travel of the combine harvester 1 is moved, cereal culms that are not reaped are remained after simply translating the adjacent second straight-line course. However, since the combine harvester 1 according to this embodiment conducts correction by inclining the second straight-line course according to the incline by the movement of the first straight-line course, the straight-line courses that are aligned parallel to each other can be similarly corrected together. Therefore, the travel route can be corrected so that the reaping work will be conducted without remaining cereal culms.

As described above, according to the present invention, the combine harvester 1 that, in a case when a movement of a straight-line course in which an automatic reaping travel is conducted is to be made midway in the straight-line course, can appropriately correct another adjacent straight-line course can be provided.

Further, in another embodiment, the automatic drive operation unit 31 of the operation unit 9 of the combine harvester 1 functions, when the on-going first straight-line course is moved by the course movement unit 63 during the automatic reaping travel, as a correction selecting unit that selects whether the adjacent second straight-line course is to be corrected or not. For example, the automatic drive operation unit 31 as the correction selecting unit displays a correction selecting screen on which correction selecting information about whether the second straight-line course is to be corrected or not (performance of correction or no correction) can be selected on a touch panel. The automatic drive operation unit 31 sends the correction selecting information that has been input according to the operation on the correction selecting screen to the control unit 50.

The correction selecting unit displays the correction selecting screen at a predetermined timing after the automatic reaping travel of the first straight-line course is finished and before the automatic reaping travel of the second straight-line course is started, for example, at the point of time when the automatic reaping travel of the second straight-line course is started. Note that, when the automatic straight travel mode is set, the automatic drive operation unit 31 disables the operation of the start switch until the selecting operation via the correction selecting screen is conducted, and enables the operation of the start switch after the selecting operation via the correction selecting screen is conducted.

In another embodiment as described above, the course correction unit 64 corrects the second straight-line course adjacent to the first straight-line course when the correction selecting information received from the automatic drive operation unit 31 as the correction selecting unit indicates performance of correction. On the other hand, when the correction selecting information indicates no correction, the course correction unit 64 does not conduct the correction of the second straight-line course.

In this way, a worker can arbitrarily select whether the correction is needed or not about the second straight-line course, etc. other than the first straight-line course that is arbitrarily moved. Therefore, the automatic reaping travel can be conducted according to the purpose of the worker.

Further, in another embodiment, when the first straight-line course is moved by the course movement unit 63, the automatic drive operation unit 31 as the correction selecting unit determines the incline angle between the straight line connecting the start point and the end point of the first straight-line course before movement and the straight line connecting the start point and the end point of the first straight-line course after movement. When the incline angle of the first straight-line courses before and after movement is inclined by an angle equal to or larger than a predetermined angle, the correction selecting unit enables selection of performance of correction of the adjacent second straight-line course. On the other hand, when the incline angle is lower the predetermined angle, the correction selecting unit makes it impossible to select performance of correction of the second straight-line course, does not display the correction selecting screen, and does not conduct the correction of the second straight-line course by the course correction unit 64. Note that the predetermined angle that is to be compared with the incline angle of the first straight-line course is preferably set to be smaller as the length of the straight-line course in the forward direction becomes longer and to be larger as the length of the straight-line course in the forward direction becomes shorter, and may be arbitrary set by a worker.

In this way, when the movement of the first straight-line course is relatively large so that the incline angle is equal to or larger than the predetermined angle, it is determined that there is a problem in the automatic reaping travel and an opportunity for correction of the second straight-line course can be provided. On the other hand, when the movement of the first straight-line course is relatively small so that the incline angle is less than the predetermined angle, it is determined that there is less influence on the work of another straight-line course and an effort for selecting whether the correction of the second straight-line course is needed or not can be omitted.

In another case, in another embodiment, when the first straight-line course is moved by the course movement unit 63, the automatic drive operation unit 31 as the correction selecting unit may determine a moving distance between the position of the end point of the first straight-line course before movement and the position of the end point of the first straight-line course after movement. In this case, when the end point of the first straight-line courses before and after movement is moved by a distance equal to or longer than a predetermined distance, the correction selecting unit enables selection of performance of correction of the adjacent second straight-line course. On the other hand, when the moving distance of the end point of the first straight-line course is shorter than the predetermined distance, the correction selecting unit makes it impossible to select performance of correction of the second straight-line course, does not display the correction selecting screen, and does not conduct the correction of the second straight-line course by the course correction unit 64. Note that the predetermined distance that is to be determined may be set to be, for example, a reaping width of a predetermined number of rows, and may be arbitrary set by a worker.

Further, in another embodiment, when the first straight-line course is moved by the course movement unit 63, the automatic drive operation unit 31 as the correction selecting unit preferably displays the second straight-line course before correction and the second straight-line course after correction on the touch panel in different displaying manners so that one of the second straight-line courses can be selected as the way to accept the selection of whether the adjacent second straight-line course is to be corrected or not. The correction selecting unit may display the farm field map on the above-described correction selecting screen and, at the same time, display the second straight-line course before correction and the second straight-line course after correction on the farm field map so that the second straight-line courses can be selected. The correction selecting unit sets the correction selecting information as no correction when the second straight-line course before correction is selected, and on the other hand, sets the correction selecting information as performance of correction when the second straight-line course after correction is selected. For example, the correction selecting unit displays the second straight-line course before correction and the second straight-line course after correction so that the second straight-line course can be identified by different kinds of line, different line colors, different line thicknesses, and different shadings.

Further, the correction selecting unit displays the second straight-line course before correction and the second straight-line course after correction so that the second straight-line course can be temporarily selected, and after any one of these courses is temporarily selected, decides the selection of the temporarily-selected one of the second straight-line course before correction or the second straight-line course after correction according to a decision operation of a decision button, etc. and sets the corresponding correction selecting information. Further, the correction selecting unit preferably displays the reaping width of the second straight-line course before correction or the second straight-line course after correction that is being temporarily selected on the farm field map on the correction selecting screen. In the farm field map, the farm field, the yet-to-be-reaped region, the headland, and the travel route, etc. are reduced in a predetermined reduction ratio and displayed. In this case, the correction selecting unit reduces the length in the forward direction of the second straight-line course that is being selected and a frame indicating a range of the reaping width, etc. in the same reduction ratio and adjusts the positions on the farm field to display them.

In this way, a worker can decide and select whether the correction of the second straight-line course is needed or not while comparing and checking the second straight-line course before correction and the second straight-line course after correction.

In the embodiments described above, although the example of the combine harvester 1 that is composed of a head-feeding type combine harvester, the present invention is not limited to this example and the combine harvester 1 may be composed of a normal type combine harvester.

Note that the present invention can be appropriately changed without departing from an outline and an idea of the invention that can be read from the claims and the entire specification, and a combine harvester and a travel route correction method including such a change is also included in the technical idea of the present invention.

DESCRIPTION OF REFERENCE NUMERALS

1 . . . combine harvester
2 . . . traveling unit
3 . . . reaping unit
31 . . . automatic drive operation unit (correction selecting unit)
32, 54 . . . display unit
50 . . . control unit
51 . . . storage unit
52 . . . communication unit
53 . . . mobile terminal
60 . . . farm field information setting unit
61 . . . travel route creation unit
62 . . . automatic drive control unit
63 . . . course movement unit
64 . . . course correction unit
P1, P2, P3 . . . travel route
R1a, R2a, R3a . . . first straight-line course
R1b, R2b, R3b . . . second straight-line course

The invention claimed is:

1. A combine harvester for conducting an automatic reaping travel according to a travel route, the combine harvester comprising:
    a travel route creation unit configured to create the travel route including;
        a first straight-line course; and
        a second straight-line course parallel to and adjacent to the first straight-line course in a yet-to-be-reaped region in a field;
    an automatic drive control unit configured to control automatic traveling and automatic reaping in association with the travel route;
    a course movement unit configured to move the first straight-line course in a direction intersecting with a forward direction to correct the travel route while the automatic reaping travel is performed based on the first straight-line course; and
    a course correction unit configured to, when the first straight-line course is moved in one direction, incline at least a part of the second straight-line course to the one direction to correct the part of the second straight-line course.

2. The combine harvester according to claim 1, wherein, when an end point of the first straight-line course is moved in the one direction by a movement of the first straight-line course, the course correction unit is further configured to incline the second straight-line course to the one direction to correct the second straight-line course.

3. The combine harvester according to claim 2, wherein:
    the course movement unit is configured to conduct translation of the first straight-line course to modify the travel route;
    the combine harvester further comprises a correction selecting unit configured to select whether the second straight-line course is to be corrected or not when the translation of the first straight-line course is conducted; and
    the course correction unit is further configured to modify the second straight-line course when performance of correction is selected by the correction selecting unit.

4. The combine harvester according to claim 3, wherein, when a straight line connecting a start point and an end point of the first straight-line course is inclined by an angle greater than or equal to a predetermined angle between before and after movement of the first straight-line course, the correction selecting unit is configured to enable selection of correction of the second straight-line course.

5. The combine harvester according to claim 3, further comprising:
    a display unit configured to display the travel route along with a shape of the field; and
    wherein the correction selecting unit is configured to display the second straight-line course before correction and the second straight-line course after correction in different displaying manners on the display unit to enable selection of any one of the second straight-line course before correction or the second straight-line course after correction.

6. The combine harvester according to claim 5, wherein the the correction selecting unit is configured to display a reaping width of the second straight-line course that is temporarily selected from the second straight-line course before correction and the second straight-line course after correction, on the display unit.

7. A travel route correction method for correcting a travel route on which a combine harvester conducts an automatic reaping travel, the travel route correction method comprising:
   moving, in the travel route including at least a first straight-line course and a second straight-line course parallel to and adjacent to the first straight-line course in a yet-to-be-reaped region in a field, the first straight-line course in a direction intersecting with a forward direction to correct the travel route while conducting the automatic reaping travel of the first straight-line course; and
   inclining at least a part of the second straight-line course in one direction to correct the part of the second straight-line course when the first straight-line course is moved in the one direction.

8. The travel route correction method according to claim 7, wherein, when an end point of the first straight-line course is moved in the one direction by movement of the first straight-line course, inclining the part of the second straight-line course includes inclining the second straight-line course to the one direction to correct the second straight-line course.

9. The travel route correction method according to claim 8, wherein:
   moving includes conducting translation of the first straight-line course to correct the travel route;
   the travel route correction method further includes:
      selecting whether the second straight-line course is to be corrected or not when the translation of the first straight-line course is conducted;
      conducting correction of the second straight-line course based on selection of performance of the second straight-line course.

10. The travel route correction method according to claim 9, wherein, when a straight line connecting a start point and an end point of the first straight-line course is inclined by an angle greater than or equal to a predetermined angle between before and after movement of the first straight-line course, selecting whether the second straight-line course is to be corrected or not enables selection of correction of the second straight-line course.

11. The travel route correction method according to claim 9, further comprising displaying the second straight-line course before correction and the second straight-line course after correction in different displaying manners on a display unit of the combine harvester that displays the travel route along with a shape of the field to enable selection of any one of the second straight-line course before correction or the second straight-line course after correction.

12. The travel route correction method according to claim 11, further comprising displaying a reaping width of the second straight-line course that is temporarily selected from the second straight-line course before correction and the second straight-line course after correction, on the display unit.

* * * * *